United States Patent [19]
Kelly et al.

[11] 3,715,007
[45] Feb. 6, 1973

[54] GAS CUSHION CONTROL FOR SEISMIC GAS EXPLODER

[75] Inventors: Gilbert H. Kelly, Irving; Herbert D. Coburn, Dallas, both of Tex.

[73] Assignee: Texas Instruments Incorporated, Dallas, Tex.

[22] Filed: Oct. 5, 1970

[21] Appl. No.: 77,767

[52] U.S. Cl. ..........................181/.5 NC, 181/.5 EC
[51] Int. Cl. ..................................................G01v 1/10
[58] Field of Search........181/.5 NC, .5 EC; 137/469; 102/25

[56] References Cited

UNITED STATES PATENTS

| | | | |
|---|---|---|---|
| 3,588,801 | 6/1971 | Leonard | 181/.5 NC |
| 3,198,282 | 8/1965 | Dunaway | 181/.5 NC |
| 3,480,102 | 11/1969 | Kilmer | 181/.5 NC |
| 3,422,447 | 1/1969 | Kilmer | 181/.5 NC |
| 3,052,259 | 9/1962 | Velden | 137/469 |
| 3,055,388 | 9/1962 | Tebb et al. | 137/469 |

FOREIGN PATENTS OR APPLICATIONS

| | | | |
|---|---|---|---|
| 808,964 | 3/1969 | Canada | 181/.5 NC |

*Primary Examiner*—Benjamin A. Borchelt
*Assistant Examiner*—N. Moskowitz
*Attorney*—James O. Dixon, Andrew M. Hassell, Rene E. Grossman, Harold Levine and Melvin Sharp

[57] ABSTRACT

Disclosed is a seismic gas exploder in which the exhaust system is controlled to cause the retention of exhaust gases in a pressurized volume within the body of the exploder. This volume of gas then acts as an energy absorbing cushion or shock absorber against which the gas exploder can bounce and rebound without injecting unwanted secondary shock energy into the ground. Retention of the exhaust gases in this manner allows near peak pressure to be developed from a charge.

17 Claims, 7 Drawing Figures

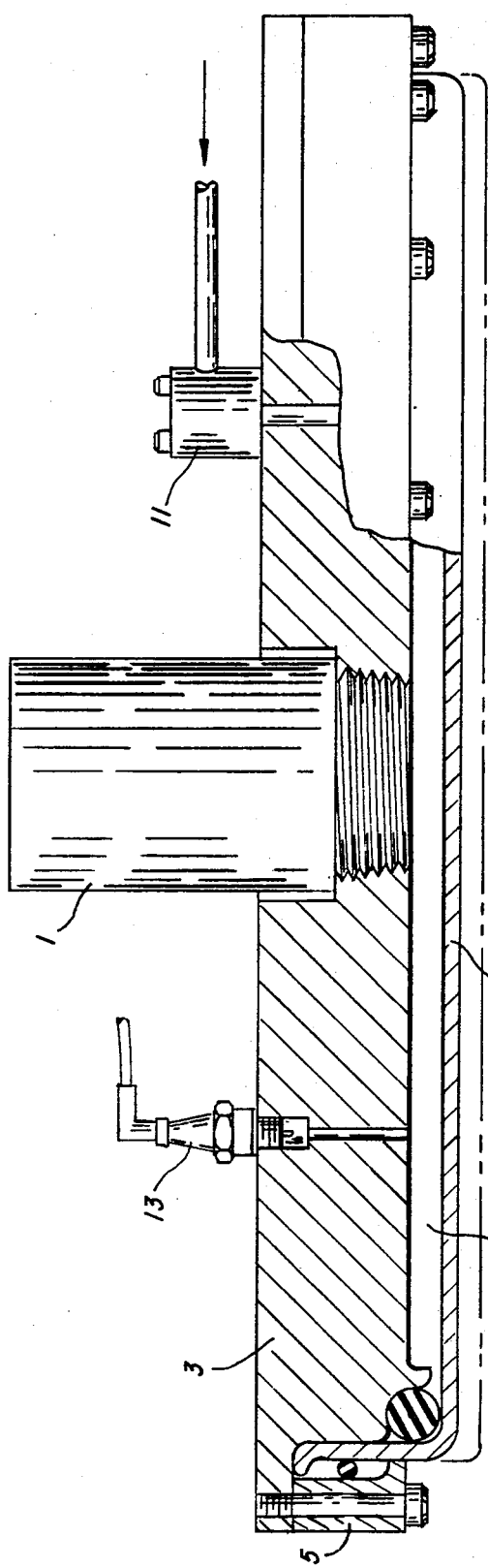
Fig.1
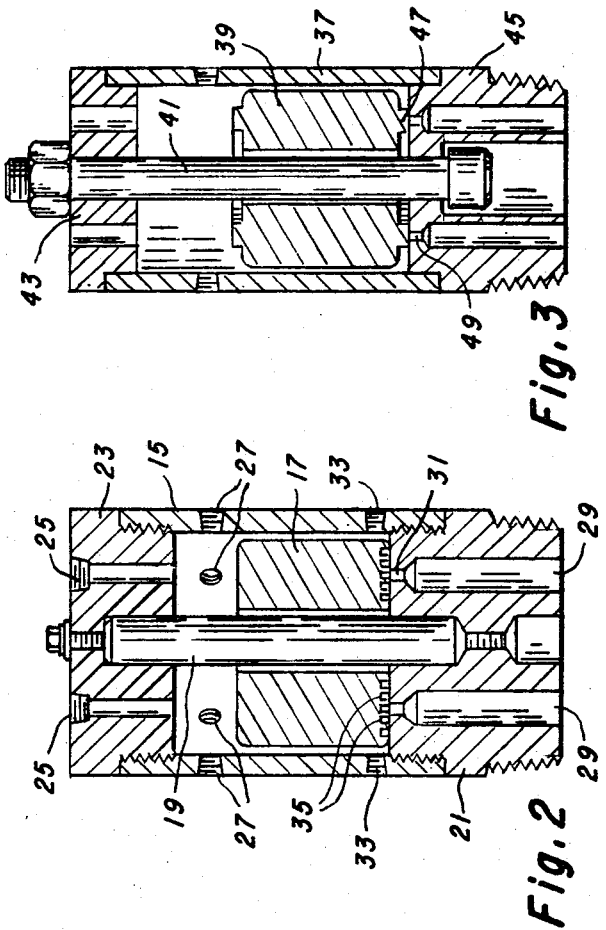
Fig.2
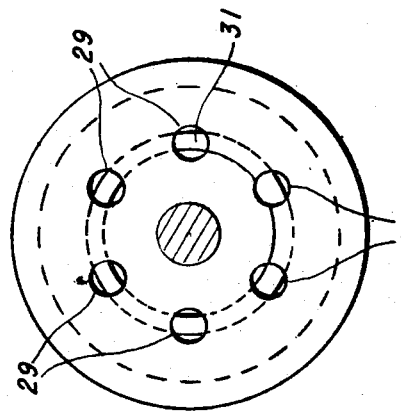
Fig.2a
Fig.3

GAS CUSHION CONTROL FOR SEISMIC GAS EXPLODER

This invention relates to petroleum exploration, and more specifically to the generation of seismic waves from which seismic recordings are made. Still more specifically the invention relates to a gas exploder used to generate seismic waves.

In the petroleum exploration industry a device called a gas exploder, or commonly a gas "gun", is frequently used to generate seismic waves. A typical gas gun comprises a movable pan-shaped member affixed to a heavy stationary member, forming a combustion chamber between the two members. The stationary member is normally attached to a weighted object such as a truck. In use, a mixture of oxygen and propane is fed into the combustion chamber and then exploded by means of an ignition spark. This explosion drives the pan-shaped member into engagement with the earth with sufficient force to generate a detectable seismic wave. The force of the explosion will also raise the stationary member with respect to the pan-shaped member.

The exhaust system in a conventional gas gun comprises a movable piston mounted in a cylinder located in the stationary member. Tension in a spring forces the piston downward in the cylinder such that the piston originally occupies the entire volume of the cylinder. The explosion forces the piston upward in the cylinder. The tension in the spring is matched to the desired explosive force such that when the piston has raised to a specific height the exhaust gases and pressure escape through exhaust ports in the cylinder wall. This sudden release of pressure from the combustion chamber results in the stationary member rebounding against the pan-shaped member and introducing secondary seismic waves into the earth. These secondary waves interfere with seismic recordings being made from the original seismic wave. Also, maximum fuel efficiency cannot be obtained because peak pressure is not achieved in the combustion chamber.

Accordingly, it is an object of the present invention to provide a gas gun wherein creation of secondary shock waves is avoided.

It is a further object of the invention to provide a gas gun wherein creation of secondary shock waves is avoided by means of controlling the exhaust system of the gas gun.

Another object of the invention is to provide a gas gun wherein peak pressure and maximum efficiency are achieved from a charge.

Another problem with the conventional gas gun is failure to obtain effective purging of the combustion chamber after ignition of a charge. If the tension in the exhaust piston spring is adjusted so that the piston is raised sufficiently high and sufficiently long to achieve effective purging of the combustion chamber, this minimizes the pressure developed by a specific charge, thus reducing the strength of the seismic wave generated. As the typical fuel combination of propane and oxygen does not burn cleanly, effective purging of the combustion chamber is essential to obtain efficient burning of fuel and to avoid premature explosions caused by burning residue setting off the fuel charge as the combustion chamber is refueled. Thus there is an inherent tradeoff in the operation of a conventional gas gun between obtaining peak charge pressure and effective combustion chamber purging.

Accordingly, another object of the present invention is to obtain effective cleaning and purging of the combustion chamber without the deficiency of reduced peak pressure.

In accordance with the stated objects, the gas gun of the present invention comprises a gas cushion valve which maintains exhaust pressure in the combustion chamber and then controls the release of the exhaust gases in such a manner as to avoid creation of secondary shock waves and yet obtain effective purging of the combustion chamber. The combustion chamber remains closed or relatively closed to the atmosphere during the creation of peak combustion pressure.

For a more complete understanding of the present invention, reference should now be made to the following detailed description, taken in conjunction with the accompanying drawings, in which:

FIG. 1 is a cross-section of a gas gun having a gas cushion valve in accordance with the present invention;

FIG. 2 is a section view of the gas cushion valve;

FIG. 2a is an end view of the gas cushion valve of FIG. 2;

FIG. 3 is a second embodiment of a gas cushion valve;

Figure 4:
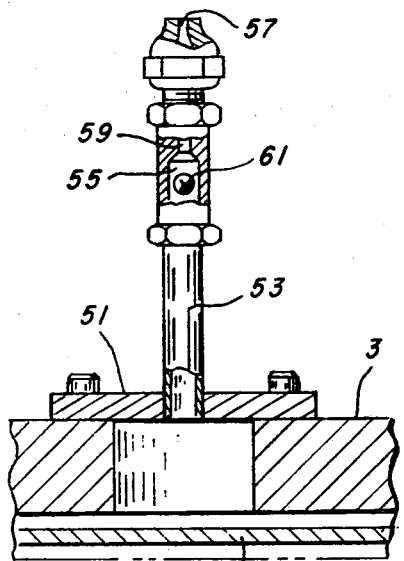
FIG. 4 is a further embodiment of the present invention, utilizing a ball check valve and controlled orifice to form a gas cushion exhaust.

Referring now to FIG. 1, a typical gas gun is shown wherein, in accordance with the invention, a gas cushion valve 1 is provided. The gas gun comprises a heavy upper member 3 to which is movably attached and held in place by retaining ring 5 a pan-shaped member 7, forming a combustion chamber 9 between the two members. In use, a suitable fuel mixture, such as oxygen and propane, is introduced under pressure into combustion chamber 9 by means of injector 11. The member 3 is normally mounted onto a weighted object such as a truck, thus to provide additional weight to hold member 7 against the earth. The pressurized fuel mixture in combustion chamber 9 is ignited by a spark plug 13, thereby creating an explosion in combustion chamber 9. The force of the explosion drives pan-shaped member 7 into harder contact with the earth, thereby creating an impulse seismic wave, and at the same time raises upper member 3 and the truck to which it is attached vertically with respect to member 7, thereby increasing the volume in combustion chamber 9. Gas cushion valve 1 prevents member 3, under the additional weight of the truck, from immediately slamming down against member 7 at the end of combustion and introducing secondary shock waves into the earth, and thus interferring with the seismic recordings being made from the impulse created by the explosion.

The preferred embodiment of the gas cushion valve of the invention is illustrated in FIG. 2. The valve comprises a cylinder 15 containing a piston 17 slidably mounted on a rod 19. Connecting member 21 is threadedly mounted at one end of cylinder 15 and also threadedly mounts into the gas gun. At the other end of the chamber of cylinder 15, end member 23 is threadedly mounted. A plurality of orifices 25 in end member 23 and a plurality of ports 27 in cylinder 15 allow the controlled escape of air in the upper part of the cylinder chamber as piston 17 is thrust upward by the explosion in the combustion chamber. The orifices 25 may be plugged or left open, depending upon fill pressure and other factors. Circular ports 29, which open into the combustion chamber of the gas gun, extend nearly through connecting member 21 at which point they interface with a circular groove 31. An end view of the gas cushion valve of FIG. 2 is shown in FIG. 2a, to more clearly depict the arrangement of the plurality of ports 29 and the groove 31 in connecting member 21. Exhaust ports 33 in cylinder 15 allow the controlled escape of exhaust gases and pressure from the combustion chamber. A plurality of circular grooves 35 in piston 17 provide a more effective initial seal (known as a labyrinth seal) between the piston 17 and connecting member 21, thereby preventing the premature escape of the pressurized fuel mixture.

When the fuel mixture is introduced under pressure into the combustion chamber, this pressure is exerted against piston 17 by way of ports 29 and groove 31. The weight of piston 17 is matched to the desired charge pressure, such that if an excessive charge is introduced, piston 17 will be slightly raised and allow pressure to escape through exhaust ports 33. This prevents an excessive charge from being exploded in the gun and bursting the pan-shaped member which is in contact with the ground, or otherwise damaging the gas gun. As excessive pressure is bled off, piston 17 drops back into place against connecting member 21, thereby sealing off the combustion chamber from the atmosphere.

When the fuel mixture is exploded in the combustion chamber of the gas gun, force is exerted through groove 31 against piston 17. The piston is thrust upward, forcing air out of the piston chamber through orifices 25 and ports 27. The size of orifices 25 and ports 27 is determined from the mass of piston 17 and desired explosive force such that the piston will not strike end member 23, or will do so with negligible force. The slowly escaping air in the upper part of the piston chamber forms a cushion and absorbs most of the energy transferred to piston 17 during the explosion.

Meanwhile, the exhaust gases and pressure are being released through exhaust ports 33, which are very small as compared to the internal volume of the gas gun. Exit of the exhaust gases is sufficiently delayed, and controlled by the small area open to the atmosphere, that very near peak pressure is obtained from the exploded charge. The exhaust gases continue to rush out of the combustion chamber under their own pressure as well as the pressure created by the slow descent of the upper member of the gas gun and attached weight. The piston 17 rebounds against the outrushing gas stream, partly under force of gravity and partly rebounded by the air cushion, and is again forced upward. By the time the piston 17 settles into place against connecting member 21, sealing off the combustion chamber from the atmosphere, the momentum of the outrushing exhaust gases has created a partial vacuum in the combustion chamber, thereby effectively purging it.

It should now be apparent that the preferred gas cushion valve achieves the stated objects of the invention. The controlled release of the exhaust gases in the manner described above prevents the upper member of the gas gun from slamming down against the lower member and introducing secondary shock waves. Near peak pressure is developed from a charge, and yet effective purging of the combustion chamber is obtained. In a gas gun equipped with the gas cushion valve described above, approximately 30 percent more energy is introduced into the earth than is introduced with a typical conventional gas gun that is loaded with an identical fuel charge.

In one embodiment of the gas cushion valve of FIG. 2, designed for use in a gas gun having a 55-inch diameter pan, the piston 17 weighs 7.6 pounds and has a 1.5-inch stroke. There are four exhaust ports 33 each having an area of 0.110 square inches. There are two orifices 25 which are 1/32-inch in diameter. There are six ports 29 which are each 0.0625 square inches in area. This gas cushion valve is designed to hold a fuel charge fill pressure on the order of 7 – 10 psi. A gas gun employing the gas cushion valve just described consistently generates impulse seismic waves of approximately 30 percent more energy than the same gas gun employing the conventional spring-loaded exhaust system, and loaded with an identical charge.

An alternate construction of the preferred type of gas cushion valve is shown in FIG. 3. A feature of this embodiment is that it is easy to manufacture and assemble. Cylinder 37 contains piston 39 slidably mounted on a rod 41. Rod 41 is a large bolt which holds end member 43 and connecting member 45 into place at the respective ends of cylinder 37. The operation of this valve is identical to that already described. It will be noted that the circular grooves in the piston have been replaced by an extended ridge 47 which covers groove 49. This construction allows the escape of excessive charge pressure from the combustion chamber but otherwise effectively seals off the combustion chamber from the atmosphere. The piston construction of FIG. 3 has been found to provide a better seal, more consistently maintaining the desired fill pressure and opening to allow the exact amount of excess fill pressure to bleed off, than the labyrinth seal of FIG. 2.

In its most basic form the invention is illustrated in FIG. 4. A conventional gas gun can be quite easily modified to comprise this embodiment. The conventional spring-load exhaust system has been removed and the space left thereby is covered by a cover plate 51. Riser pipe 53 extends through cover plate 51 and opens into the combustion chamber of the gas gun. At the upper end of riser pipe 53 is connected check valve 55 and controlled orifice 57. If an excessive charge is introduced into the combustion chamber, check valve 55 opens and bleeds off the excessive pressure through exhaust port 59 and orifice 57. When the fuel mixture in the combustion chamber is ignited the force of the resulting explosion closes check valve 55 by lifting ball 61 into its seat on exhaust port 59. This seals off the combustion chamber from the atmosphere and allows peak pressure and maximum energy to be developed.

The exhaust gases are trapped under pressure in the combustion chamber and prevent the upper member of the gas gun from rebounding against the lower member. As the gas gun cools, the pressure in the combustion chamber reduces and ball 61 will drop from its seat on exhaust port 59, thereby opening the combustion chamber to the atmosphere through exhaust port 59 and orifice 57. Orifice 57 can be adjusted to bleed off the exhaust gases at a rate which allows the truck and the upper member of the gas gun to descend slowly.

Figure 5:
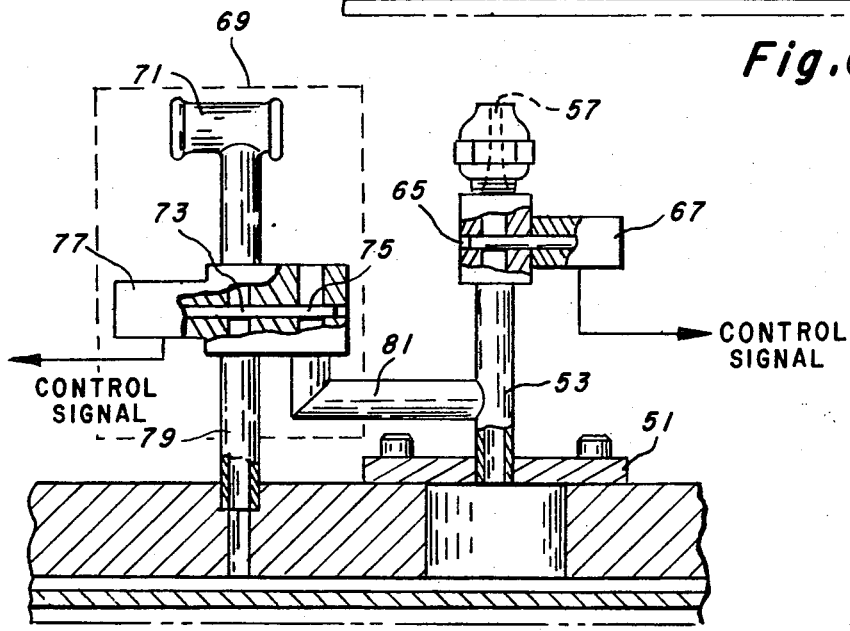
FIG. 5 is a drawing of an embodiment of the invention which comprises a valve which is opened by an actuator in response to an external control signal to release the exhaust gases and pressure through a controlled orifice.

FIG. 5 shows another illustrative embodiment of the invention. Cover plate 51, riser pipe 53 and controlled orifice 57 are the same as described immediately above. Valve assembly 65 is controlled by a remotely operated actuator 67. The actuator 67 may be operated mechanically, electrically, hydraulically or pneumatically. Actuator 67 is controlled by an external control signal which may be programmed to cause valve assembly 65 to open at any specified time after the explosion has occurred. Thus, the gas cushion can be held to absorb the rebound energy of the upper member of the gas gun, and then released at a controlled rate through orifice 57 to allow the upper member to descend gently. Maximum energy is obtained because the combustion chamber is completely closed to the atmosphere during the creation of peak pressure.

In the operation described immediately above, effective purging and cleaning of the combustion chamber will not be obtained. This may be accomplished by the addition of a blower system 69. Blower system 69 comprises a high volume, low pressure blower 71, two sliding disc gate valves 73 and 75, actuator 77, riser pipe 79 and connecting pipe 81. At the end of the operating cycle as described above, actuator 77 is energized to open valves 73 and 75. Clean air under pressure from blower 71 flows through valve 73, through the combustion chamber, and out through valve 75. The actuator is then de-energized to cut off the flow of wash air. It should be apparent that any of the embodiments described herein could be so equipped.

An alternative construction (not shown) of the embodiment of FIG. 5 would consist of replacing controlled orifice 57 with a large diameter exhaust port. Valve assembly 65 would then preferably be a special type of sliding disc gate construction having extremely large ports which permit high flow rates with minimum pressure drop. After the explosion in the combustion chamber, valve 65 remains closed until the seismic recording has been completed. Then valve 65 is opened and the exhaust gases rush out through the large exhaust port as the truck and upper member of the gas gun rapidly descend. The outrushing gases leave a partial vacuum in the combustion chamber, thereby effectively purging it.

Figure 6:
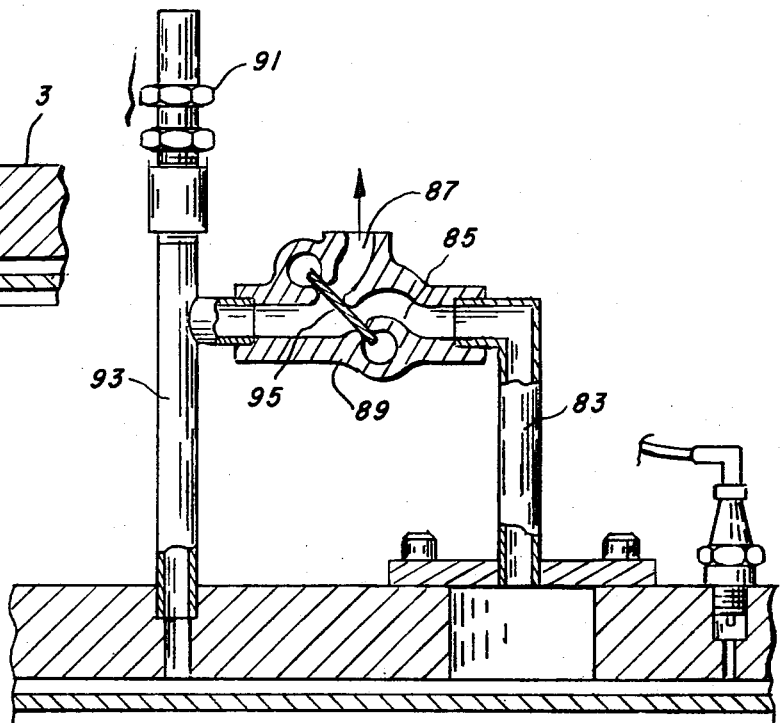
FIG. 6 shows another embodiment operating upon the basic principles of the embodiment of FIG. 5.

The illustrative embodiment of FIG. 6 operates substantially similar to the embodiment described immediately above, but eliminates the expense and complication of employing an externally controlled actuator. Riser pipe 83 and passages 85 and 87 of exhaust valve 89 are large. Check valve 91 is spring loaded with just enough force to contain the fill pressure in the combustion chamber. An excessive charge will open check valve 91 and bleed it off to a safe pressure. When the fuel mixture is ignited the force of the explosion opens check valve 91, which begins to bleed off the exhaust pressure. Check valve 91 has very small ports which allow only a very small amount of pressure to bleed off. As the pressure is slowly reduced in riser pipe 93, a pressure differential is created across flexible diaphragm 95 is exhaust valve 89. The pressure differential causes passage 85 to be opened to passage 87, allowing the exhaust gases to rush out and leave a partial vacuum in the combustion chamber. This sudden outrush of the exhaust gases allows the upper member of the gas gun to drop suddenly against the pan-shaped member, but check valve 91 can be adjusted so that the seismic recordings will be completed before the pressure differential across diaphragm 95 is sufficient to open the exhaust passage.

The present invention having been described with particular reference to specific embodiments thereof, certain modifications that fall within the inventive concept may now suggest themselves to those skilled in the art. The scope of the invention is defined by the following claims.

What is claimed is:

1. A gas gun for use in seismic exploration comprising:
   a. a first member and a second member which form a combustion chamber therebetween, said second member being movable with respect to said first member;
   b. means for introducing a gaseous fuel mixture into said combustion chamber;
   c. means for igniting said gaseous fuel mixture; and
   d. a gas cushion valve coupled to said first member which comprises a cylinder having a piston suspended therein, said cylinder having at least one air escape port near the upper end thereof and at least one exhaust port near the lower end thereof, and further having at least one connecting port which connects said lower end to said combustion chamber; whereby
   e. combustion pressure exerted against said piston through said connecting port raises said piston, forcing an outrush of air through said air escape port and allowing the escape of exhaust pressure and gases through said exhaust port.

2. The gas gun of claim 1 wherein the weight of said piston is set to hold a predetermined fuel charge pressure in said combustion chamber.

3. The gas gun of claim 1 wherein said piston is slidably mounted on a rod extending through said cylinder.

4. The gas gun of claim 1 further including upper and lower end members coupled to said cylinder to form a chamber, said upper and lower end members each having at least one port extending therethrough, and wherein said piston is slidably mounted on a rod extending through said chamber.

5. A gas gun for use in seismic exploration, comprising:
   a. a first member and a second member which form a combustion chamber therebetween, said second member being movable with respect to said first member;
   b. means for introducing a gaseous fuel mixture into said combustion chamber;

c. means for igniting said gaseous fuel mixture, thereby raising said first member with respect to said second member; and d. an exhaust system adapted to maintain pressure of combustion in said combustion chamber to prevent the first member thereof from rebounding against the second member thereof to introduce secondary seismic waves, and thence to release exhaust gases and purge said combustion chamber.

6. The gas gun of claim 5 wherein said exhaust system comprises only a valve and an exhaust port, with said valve adapted to be externally activated to open and release exhaust gases through said exhaust port after combustion.

7. The gas gun of claim 6 wherein said externally activated valve is a sliding disc gate valve.

8. The gas gun of claim 5 wherein said exhaust system comprises only an externally actuated valve and a controlled orifice.

9. The gas gun of claim 8 further including an externally actuated blower system connected to said combustion chamber.

10. The gas gun of claim 5 wherein said exhaust system is comprised only of a check valve and a controlled orifice, with said check valve being adapted to maintain a desired fuel charge pressure in said combustion chamber, to close under pressure of combustion, and to open upon sufficient cooling and reduced pressure to allow gradual escape of exhaust gases through said controlled orifice.

11. A gas gun for use in seismic exploration, comprising:

a. a first member and a second member which form a combustion chamber therebetween, said second member being movable with respect to said first member;

b. means for introducing a gaseous fuel mixture into said combustion chamber;

c. means for igniting said gaseous fuel mixture; and d. an exhaust system comprising a check valve and an exhaust valve having a diaphragm therein and further including a first connecting means interconnecting said combustion chamber to said check valve and to one side of said diaphragm and a second connecting means interconnecting said combustion chamber to the other side of said diaphragm and further connecting to the atmosphere when a pressure differential develops across said diaphragm; whereby e. at a controlled time after ignition of said fuel mixture exhaust pressure bleed off through said check valve creates a pressure differential across said diaphragm, opening said exhaust valve and releasing exhaust pressure and gases into the atmosphere.

12. A gas cushion valve adapted to control the release of exhaust gases in a seismic gas gun to avoid introduction of secondary seismic waves, comprising a cylinder having upper and lower end members to thereby form a chamber, said lower end member having at least one port extending therethrough and said cylinder having at least one port extending therethrough near each end thereof, and a movable piston suspended within said chamber.

13. The valve of claim 12 wherein said upper end member has at least one port extending therethrough.

14. The valve of claim 13 further including a circular groove in the upper portion of said lower end member and interfacing with said piston, and a plurality of selectively spaced ports in said lower end member coupling said groove to said chamber.

15. The valve of claim 14 wherein said piston is slidably mounted on a rod extending through said chamber.

16. The valve of claim 15 wherein said piston has a plurality of grooves in the end which interfaces with said lower end member to form a good seal.

17. The valve of claim 15 wherein said piston has a circular ridge in the end which interfaces with said lower end member, said ridge being at least wide enough to cover said groove in said lower end member.

* * * * *